United States Patent
Takahashi et al.

(10) Patent No.: US 8,406,967 B2
(45) Date of Patent: Mar. 26, 2013

(54) CONTROL APPARATUS AND METHOD FOR AUTOMATIC TRANSMISSION SYSTEM

(75) Inventors: Seiichiro Takahashi, Isehara (JP); Tatsuo Ochiai, Kanagawa (JP); Masaaki Uchida, Yokosuka (JP); Masato Koga, Hiratsuka (JP); Ryoji Kadono, Kawasaki (JP); Tateki Jozaki, Yokohama (JP); Hideaki Suzuki, Yokohama (JP); Ryousuke Nonomura, Kawasaki (JP); Mamiko Inoue, Machida (JP)

(73) Assignees: Nissan Motor Co., Ltd., Yokohama-shi (JP); Jatco Ltd, Fuji-shi (JP)

( * ) Notice: Subject to any disclaimer, the term of this patent is extended or adjusted under 35 U.S.C. 154(b) by 535 days.

(21) Appl. No.: 12/712,429

(22) Filed: Feb. 25, 2010

(65) Prior Publication Data

US 2010/0222971 A1 Sep. 2, 2010

(30) Foreign Application Priority Data

Mar. 2, 2009 (JP) ................................. 2009-048484

(51) Int. Cl.
*G06F 7/00* (2006.01)
*B60W 10/00* (2006.01)
*B60W 10/02* (2006.01)
*F16H 45/02* (2006.01)

(52) U.S. Cl. ................ 701/51; 701/62; 701/67; 477/80; 477/5; 477/169

(58) Field of Classification Search .................... None
See application file for complete search history.

(56) References Cited

U.S. PATENT DOCUMENTS

| 4,653,351 | A | 3/1987 | Downs et al. |
| 4,672,863 | A | 6/1987 | Itoh et al. |
| 6,182,000 | B1 | 1/2001 | Ohta et al. |
| 6,188,946 | B1 * | 2/2001 | Suzuki et al. ................... 701/62 |
| 6,219,608 | B1 * | 4/2001 | Abo et al. ........................ 701/51 |
| 6,243,638 | B1 * | 6/2001 | Abo et al. ........................ 701/51 |
| 6,377,882 | B1 | 4/2002 | Ito |
| 6,821,228 | B2 * | 11/2004 | Aoki et al. ....................... 477/44 |

(Continued)

FOREIGN PATENT DOCUMENTS

| EP | 0 410 451 A2 | 1/1991 |
| EP | 806 592 A2 | 11/1997 |

(Continued)

OTHER PUBLICATIONS

U.S. Appl. No. 12/712,437, filed Feb. 25, 2010, Takahashi et al.

(Continued)

*Primary Examiner* — Mussa A Shaawat
(74) *Attorney, Agent, or Firm* — Foley & Lardner LLP

(57) ABSTRACT

A control apparatus for an automatic transmission system having a serial arrangement of a stepwise variable automatic transmission mechanism and a continuously variable automatic transmission mechanism, the control apparatus being disposed in the automatic transmission system and performing a shift control of the continuously variable automatic transmission mechanism in accordance with variation in transmission ratio of the stepwise variable automatic transmission mechanism, the control apparatus including a control section configured to execute a retardation processing upon shift control of one of the continuously variable transmission mechanism and the stepwise variable transmission mechanism which has a smaller response delay of an actual transmission ratio from a target transmission ratio than that of the other transmission mechanism.

12 Claims, 9 Drawing Sheets

U.S. PATENT DOCUMENTS

| | | |
|---|---|---|
| 6,855,085 B1 | 2/2005 | Gumpoltsberger |
| 7,384,375 B2 | 6/2008 | Yamada et al. |
| 7,563,196 B2 | 7/2009 | Yamada et al. |
| 7,563,197 B2 | 7/2009 | Ayabe et al. |
| 7,771,316 B2 | 8/2010 | Honma et al. |
| 7,822,524 B2 | 10/2010 | Tabata et al. |
| 7,909,728 B2 * | 3/2011 | Tabata et al. ............... 477/3 |
| 7,922,617 B2 * | 4/2011 | Matsubara et al. ........... 477/3 |
| 7,998,022 B2 * | 8/2011 | Matsubara et al. ........... 477/5 |
| 8,152,667 B2 * | 4/2012 | Shibata et al. ............... 475/5 |
| 8,177,681 B2 * | 5/2012 | Matsubara et al. ........... 477/3 |
| 8,192,325 B2 * | 6/2012 | Matsubara et al. ......... 477/20 |
| 8,296,023 B2 * | 10/2012 | Kojima et al. ............... 701/59 |
| 2001/0044683 A1 | 11/2001 | Takaoka et al. |
| 2002/0035013 A1 | 3/2002 | Saito |
| 2003/0228953 A1 * | 12/2003 | Aoki et al. ................. 477/44 |
| 2005/0272555 A1 | 12/2005 | Tabata et al. |
| 2006/0154780 A1 | 7/2006 | Ayabe et al. |
| 2007/0093358 A1 | 4/2007 | Ayabe et al. |
| 2008/0182710 A1 * | 7/2008 | Shibata et al. ............... 477/3 |
| 2008/0269010 A1 * | 10/2008 | Matsubara et al. ........... 477/5 |
| 2009/0017984 A1 * | 1/2009 | Shibata et al. ............... 477/3 |
| 2009/0042691 A1 * | 2/2009 | Matsubara et al. ......... 477/80 |
| 2009/0062070 A1 * | 3/2009 | Tabata et al. ............. 477/109 |
| 2009/0088290 A1 * | 4/2009 | Tabata et al. ............... 477/5 |
| 2010/0044132 A1 * | 2/2010 | Matsubara et al. ...... 180/65.285 |
| 2010/0210412 A1 * | 8/2010 | Kojima et al. ............. 477/38 |
| 2012/0077639 A1 * | 3/2012 | Shibata et al. ............. 477/20 |

FOREIGN PATENT DOCUMENTS

| | | |
|---|---|---|
| EP | 0 959 270 A2 | 11/1999 |
| JP | 61-105361 A | 5/1986 |
| JP | 5-079554 A | 3/1993 |
| JP | 5-240335 A | 9/1993 |
| JP | 6-129528 A | 5/1994 |
| JP | 8-285064 A | 11/1996 |
| JP | 8-291858 A | 11/1996 |
| JP | 10-331962 A | 12/1998 |
| JP | 10-331963 A | 12/1998 |
| JP | 11-37267 A | 2/1999 |
| JP | 11-141675 A | 5/1999 |
| JP | 11-182663 A | 7/1999 |
| JP | 2000-205398 A | 7/2000 |
| JP | 2003-42284 A | 2/2003 |
| JP | 2003-314681 A | 11/2003 |
| JP | 2004-316811 A | 11/2004 |
| JP | 2006-348985 A | 12/2006 |
| JP | 2007-92665 A | 4/2007 |
| JP | 2007-225048 A | 9/2007 |
| JP | 2007-263206 A | 10/2007 |

OTHER PUBLICATIONS

U.S. Appl. No. 12/712,440, filed Feb. 25, 2010, Takahashi et al.
U.S. Appl. No. 12/712,448, filed Feb. 25, 2010, Takahashi et al.
U.S. Appl. No. 12/712,454, filed Feb. 25, 2010, Takahashi et al.
S. Takahashi et al., US PTO Notice of Allowance, U.S. Appl. No. 12/712,440, dated May 9, 2012, (8 pgs.).
S. Takahashi et al., US Non-Final Office Action, U.S. Appl. No. 12/712,448, dated Jul. 24, 2012, (18 pgs.).
S. Takahashi et al., US Non-Final Office Action, U.S. Appl. No. 12/712,437, dated Aug. 16, 2012, (13 pgs.).
Chinese Office Action dated Jul. 4, 2012, (12 pgs.).
S. Takahashi et al., US Notice of Allowance on U.S. Appl. No. 12/712,454) DTD Sep. 27, 2012, 13 pgs.
Takahashi et al., USPTO Non-Final Office Action, U.S. Appl. No. 12/712,440, Nov. 3, 2011, 18 pgs.
S. Takahashi et al., US Final Office Action, U.S. Appl. No. 12/712,448, dated Nov. 14, 2012, (8 pgs.).
S. Takahashi et al., US Notice of Allowance, U.S. Appl. No. 12/712,437, dated Dec. 7, 2012, (7 pgs.).

* cited by examiner

CONTROL APPARATUS AND METHOD FOR AUTOMATIC TRANSMISSION SYSTEM

BACKGROUND OF THE INVENTION

The present invention relates to a control apparatus and method for an automatic transmission system having a serial arrangement of a continuously variable transmission (or a continuously variable transmission mechanism) and a stepwise variable transmission (or a stepwise variable transmission mechanism), which is capable of performing cooperative shift control in which shift of the continuously variable transmission is controlled in accordance with a change in transmission ratio of the stepwise variable transmission.

Japanese Patent Application First Publication No. 5-079554 discloses an automatic transmission system for a vehicle in which a continuously variable transmission and a stepwise variable transmission are arranged in series. In the conventional art, upon carrying out a shift operation of the stepwise variable transmission, cooperative shift control is conducted, in which shift control of the stepwise variable transmission and shift control of the continuously variable transmission depending on change in transmission ratio of the stepwise variable transmission are simultaneously performed in order to suppress occurrence of change in a total transmission ratio of the stepwise variable transmission and the continuously variable transmission.

SUMMARY OF THE INVENTION

However, there exists a difference in response delay of an actual transmission ratio from a target transmission ratio between the continuously variable transmission and the stepwise variable transmission. In the cooperative shift control of the conventional art, a change in the total transmission ratio inevitably occurs due to the difference in response delay during the cooperative shift control.

It is an object of the present invention to provide a control apparatus and method for an automatic transmission system having a serial arrangement of a continuously variable transmission (or a continuously variable transmission mechanism) and a stepwise variable transmission (or a stepwise variable transmission mechanism), which can execute a retardation processing upon shift control of one of the continuously variable transmission and the stepwise variable transmission which has a smaller response delay of an actual transmission ratio from a target transmission ratio than that of the other thereof, on the basis of a retardation-processed target transmission ratio that is obtained by subjecting the target transmission ratio of the one of the continuously variable transmission and the stepwise variable transmission or the other thereof, to a retardation processing.

In one aspect of the present invention, there is provided a control apparatus for an automatic transmission system including a serial arrangement of a stepwise variable automatic transmission mechanism capable of selecting an optional speed from a plurality of speeds, and a continuously variable automatic transmission mechanism capable of continuously varying a transmission ratio thereof, the control apparatus being disposed in the automatic transmission system and performing a shift control of the continuously variable automatic transmission mechanism in accordance with variation in transmission ratio of the stepwise variable automatic transmission mechanism, the control apparatus comprising:

a control section configured to execute a retardation processing upon shift control of one of the continuously variable transmission mechanism and the stepwise variable transmission mechanism which has a smaller response delay of an actual transmission ratio from a target transmission ratio than that of the other transmission mechanism.

In a further aspect of the present invention, there is provided a control method of controlling an automatic transmission system including a serial arrangement of a stepwise variable automatic transmission mechanism capable of selecting an optional speed from a plurality of speeds, and a continuously variable automatic transmission mechanism capable of continuously varying a transmission ratio thereof and performing a shift control of the continuously variable automatic transmission mechanism in accordance with variation in transmission ratio of the stepwise variable automatic transmission mechanism, the control method comprising the steps of:

setting a total target transmission ratio of the continuously variable transmission mechanism and the stepwise variable transmission mechanism;

setting a target transmission ratio of one of the continuously variable transmission mechanism and the stepwise variable transmission mechanism;

setting a retardation-processed target transmission ratio by subjecting the set target transmission ratio of the one of the continuously variable transmission mechanism and the stepwise variable transmission mechanism to a retardation processing;

setting a control target transmission ratio of the other of the continuously variable transmission mechanism and the stepwise variable transmission mechanism on the basis of (a): either the set target transmission ratio before being subjected to the retardation processing or the set retardation-processed target transmission ratio, and (b): the set total target transmission ratio;

controlling the one of the continuously variable transmission mechanism and the stepwise variable transmission mechanism on the basis of either the set retardation-processed target transmission ratio or the set target transmission ratio; and controlling the other of the continuously variable transmission mechanism and the stepwise variable transmission mechanism on the basis of the set control target transmission ratio and the set total target transmission ratio.

DETAILED DESCRIPTION OF THE INVENTION

With reference to the accompanying drawings, embodiments of a control apparatus and method for an automatic transmission system, according to the present invention are explained.

First Embodiment

Figure 1:
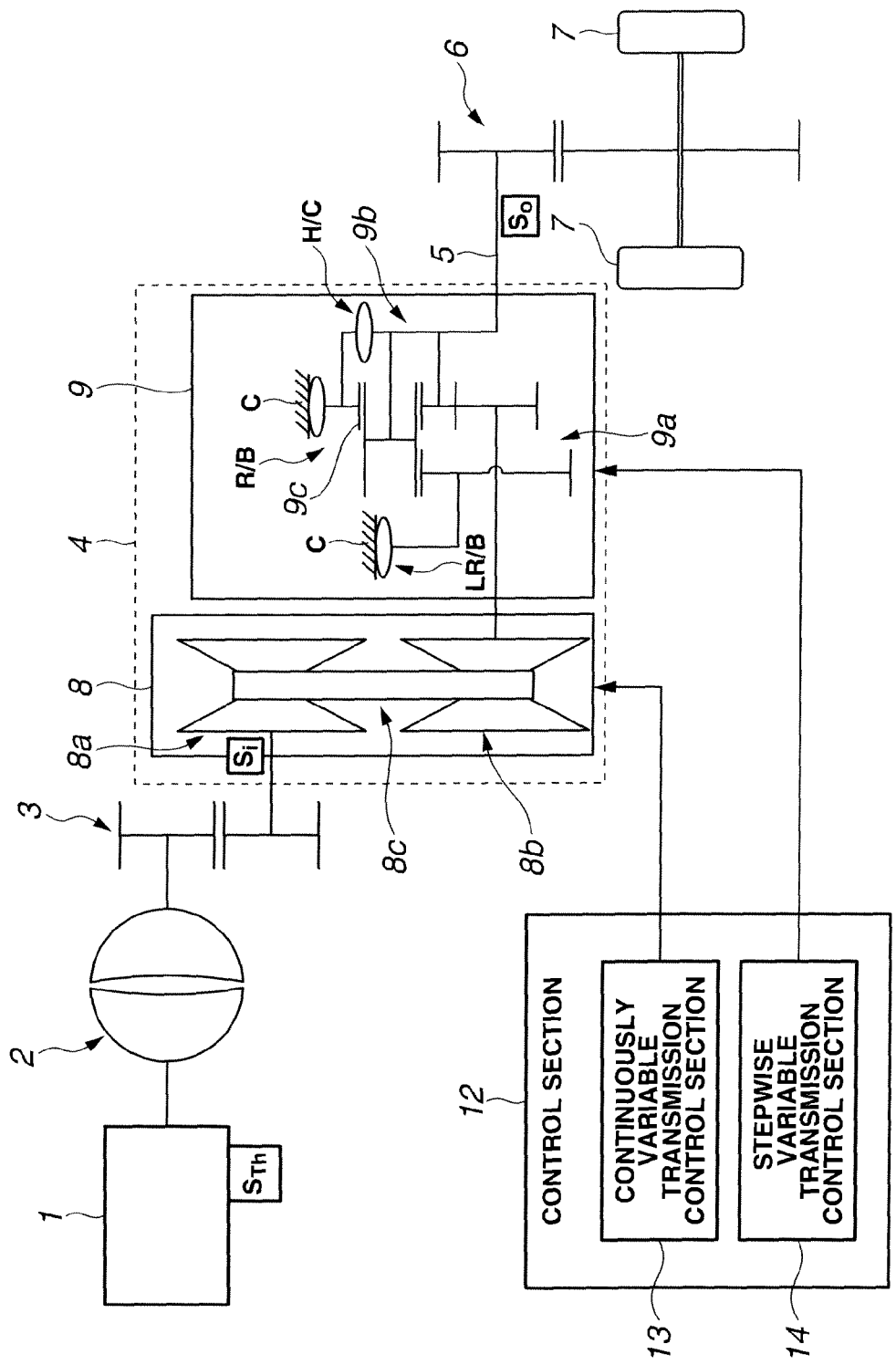
FIG. 1 is a schematic explanatory diagram showing a construction of a vehicle to which a control apparatus for an automatic transmission system, according to a first embodiment of the present invention is applied.

FIG. 1 is a schematically explanatory diagram showing a part of a construction of a vehicle including a control apparatus for an automatic transmission system, according to a first embodiment of the present invention. As illustrated in FIG. 1, drive system 1 includes engine 1 as a drive source, torque converter 2 drivingly connected to engine 1, automatic transmission system 4 drivingly connected to torque converter 2 via reduction mechanism 3, final drive gear mechanism 6 drivingly connected to automatic transmission system 4 via transmission output shaft (i.e., propeller shaft) 5, and road wheels 7 to which a power from automatic transmission system 4 is outputted via final drive gear mechanism 6.

Automatic transmission system 4 is constituted of continuously variable transmission mechanism 8 and stepwise variable transmission mechanism 9. Continuously variable transmission mechanism 8 is a known belt-drive continuously variable transmission and includes drive pulley 8a connected to an output shaft of reduction mechanism 3, driven pulley 8b connected to an input shaft of stepwise variable transmission mechanism 9, and belt 8c that is disposed between drive pulley 8a and driven pulley 8b so as to connect drive pulley 8a and driven pulley 8b with each other. Drive pulley 8a and driven pulley 8b are supplied with oil and operative to vary a width of each of pulleys 8a and 8b in accordance with a hydraulic pressure of the oil to be supplied. Thus constructed continuously variable transmission mechanism 8 can continuously vary a transmission ratio by controlling a hydraulic pressure to be applied to drive pulley 8a and a hydraulic pressure to be applied to driven pulley 8b.

Stepwise variable transmission mechanism 9 includes a Ravigneaux planetary gear set including compound sun gear 9a as an input member to which driven pulley 8b of continuously variable transmission mechanism 8 is drivingly connected, and carrier 9b as an output member which is drivingly connected to transmission output shaft 5. Sun gear 9a is fixed to casing C via low and reverse brake (i.e., first speed selecting brake) LR/B. Carrier 9b is drivingly connected to ring gear 9c via high clutch (i.e., second speed selecting clutch) H/C. Ring gear 9c is fixed to casing C via reverse brake R/B.

Low and reverse brake (hereinafter referred to simply as "low brake") LR/B, high clutch H/C and reverse brake R/B can be supplied with oil and thereby brought into an engagement state and a disengagement (or release) state, respectively, in accordance with a hydraulic pressure of the oil to be supplied. Thus constructed stepwise variable transmission mechanism 9 can select forward first speed, forward second speed and reverse speed by controlling the hydraulic pressure to be supplied to low brake LR/B, high clutch H/C and reverse brake R/B.

In a case where the forward first speed is selected, low brake LR/B is brought into the engagement state, and at the same time, high clutch H/C is brought into the disengagement state. In a case where the forward second speed is selected, low brake LR/B is brought into the disengagement state, and at the same time, high clutch H/C is brought into the engagement state. An engagement/disengagement schedule for the hydraulic pressure control in stepwise variable transmission mechanism 9 is shown in Table 1 as follows.

TABLE 1

|  | LR/B | H/C | R/B |
| --- | --- | --- | --- |
| First Speed | ○ | X | X |
| Second Speed | X | ○ | X |
| Reverse Speed | ○ | X | ○ |

As illustrated in FIG. 1, the vehicle equipped with automatic transmission system 4 includes control section 12 that performs shift control of automatic transmission system 4. Control section 12 includes continuously variable transmission control section 13 that is configured to set a target continuously variable transmission ratio for continuously variable transmission mechanism 8 (hereinafter referred to simply as "target continuously variable transmission ratio") and control continuously variable transmission mechanism 8 on the basis of the target continuously variable transmission ratio set, and stepwise variable transmission control section 14 that is configured to set a target stepwise variable transmission ratio for stepwise variable transmission mechanism 9 (hereinafter referred to simply as "target stepwise variable transmission ratio) and control stepwise variable transmission mechanism 9 on the basis of the target stepwise variable transmission ratio set.

That is, automatic transmission system 4 as a whole can realize target transmission ratio $I_0$ by cooperating shift control of continuously variable transmission mechanism 8 and shift control of stepwise variable transmission mechanism 9 with each other.

Figure 2:
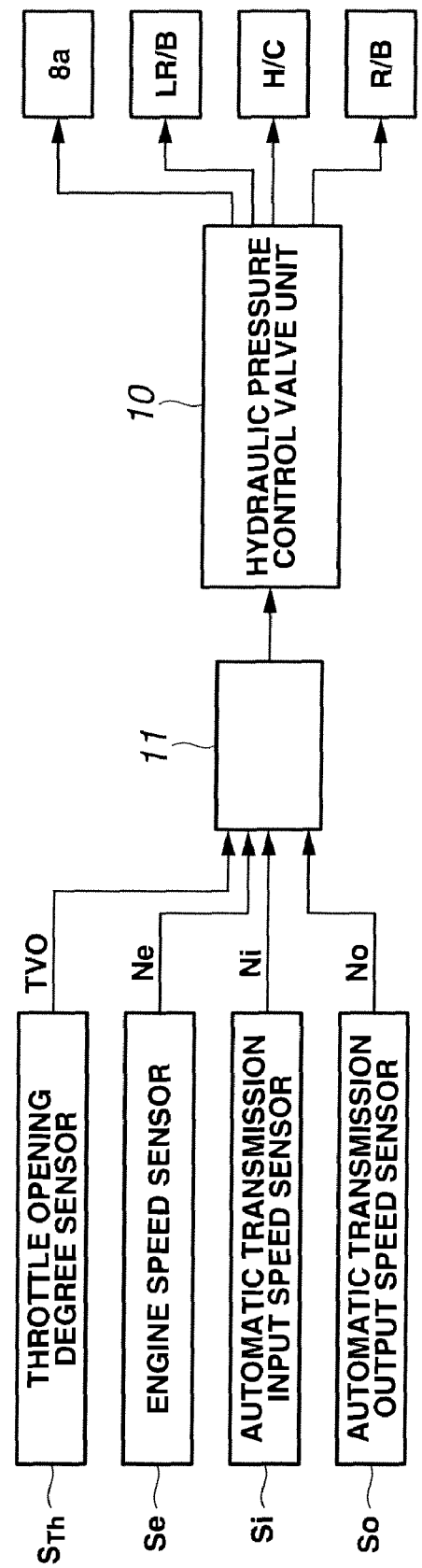
FIG. 2 is a diagram showing a control system of a power train shown in FIG. 1.

FIG. 2 is a system diagram schematically showing a shift control system of a power train shown in FIG. 1. As illustrated in FIG. 2, continuously variable transmission mechanism 8 is constructed to control the hydraulic pressure to be supplied to drive pulley 8a and the hydraulic pressure to be supplied to driven pulley 8b (usually, only the hydraulic pressure to be supplied to drive pulley 8a) by controlling a plurality of solenoid valves built in hydraulic pressure control valve unit 10 so as to switch between the ON state and the OFF state. Thus constructed continuously variable transmission mechanism 8 can non-stepwise vary the transmission ratio. Similarly, stepwise variable transmission mechanism 9 is constructed to control the hydraulic pressure to be supplied to low brake LR/B, the hydraulic pressure to be supplied to high clutch H/C and the hydraulic pressure to be supplied to reverse brake R/B by controlling a plurality of solenoid valves built in hydraulic pressure control valve unit 10 so as to switch between the ON state and the OFF state. Thus constructed stepwise variable transmission mechanism 9 can select the forward first speed or the forward second speed.

As illustrated in FIG. 2, hydraulic pressure control valve unit 10 is controlled by transmission controller 11. Transmission controller 11 is electrically connected with throttle opening degree sensor $S_{Th}$ that detects throttle opening degree TVO, engine speed sensor $S_e$ that detects output revolution number (hereinafter referred to simply as "engine speed") $N_e$ of engine 1, automatic transmission input speed sensor $S_i$ that detects input rotation number $N_i$ of automatic transmission system 4 (hereinafter referred to as "automatic transmission input rotation number"), and automatic transmission output speed sensor $S_o$ that detects rotation number $N_o$ of transmission output shaft 5 (hereinafter referred to as "automatic transmission output shaft rotation number"). A signal from throttle opening degree sensor $S_{Th}$, a signal from engine speed sensor $S_e$, a signal from automatic transmission input speed sensor $S_i$ and a signal from automatic transmission output speed sensor $S_o$ are inputted to transmission controller 11.

Figure 3:
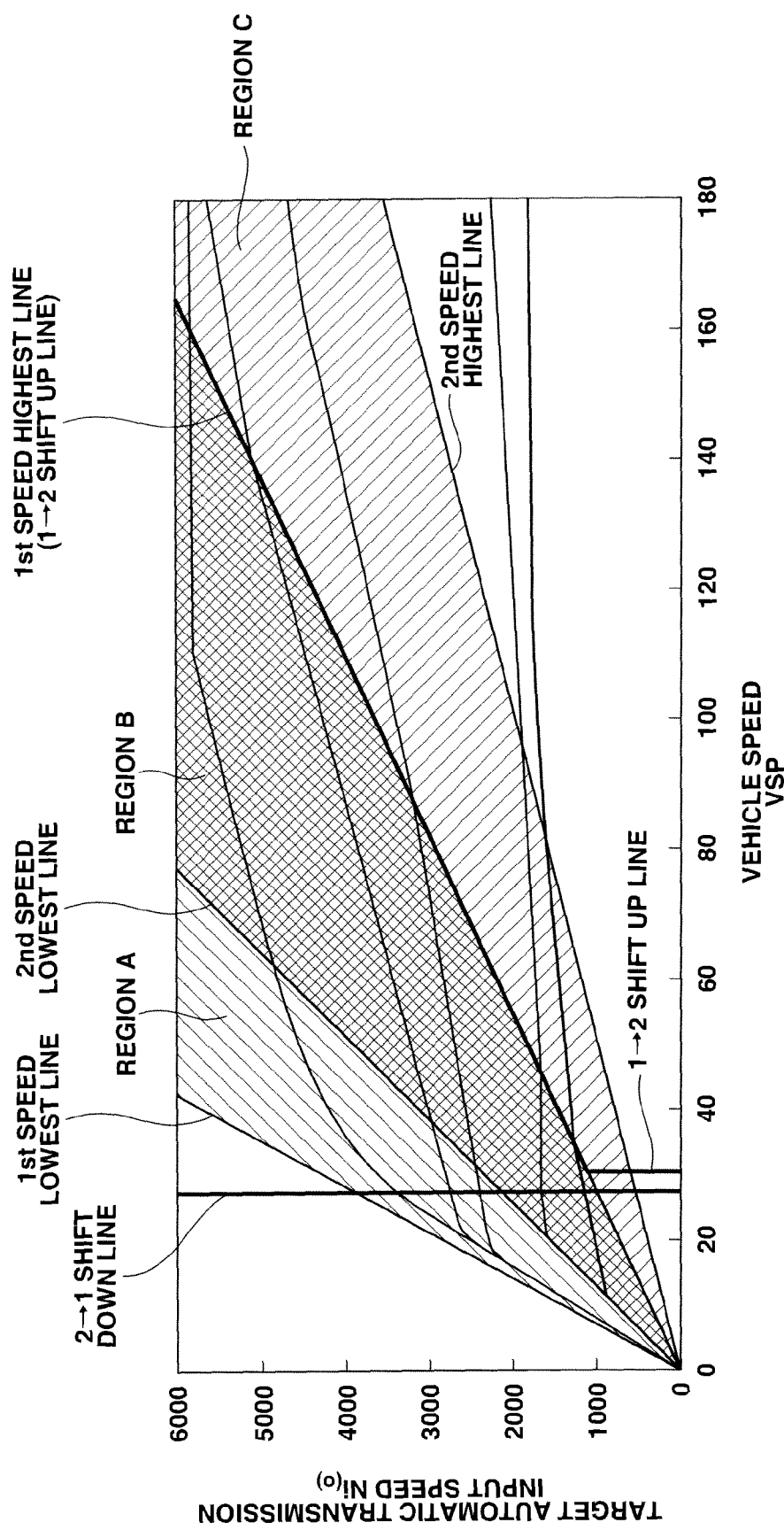
FIG. 3 is a shift map showing shift lines which are used upon shift control.

Transmission controller 11 performs shift control of automatic transmission system 4 by using a shift map shown in FIG. 3 on the basis of input information from these sensors $S_{Th}$, $S_e$, $S_i$ and $S_o$. FIG. 3 is the shift map illustrating shift lines that are used upon the shift control according to the control apparatus of FIG. 1. The shift map shown in FIG. 3 illustrates the shift lines in continuously variable transmission mechanism 8 and the shift lines in stepwise variable transmission mechanism 9 in combination thereof. In a case where the forward first speed is selected as the speed (or gear stage) of stepwise variable transmission mechanism 9, a shiftable region of continuously variable transmission mechanism 8 is a region between first speed lowest line and first speed highest line. On the other hand, in a case where the forward second speed is selected as the speed of stepwise variable transmission mechanism 9, a shiftable region of continuously variable transmission mechanism 8 is a region between the second speed lowest line and the second speed highest line.

Accordingly, region A shown in FIG. 3 is a region where continuously variable transmission mechanism 8 is shiftable only in a case where the speed of stepwise variable transmission mechanism 9 is the forward first speed. Region B shown in FIG. 3 is a region where continuously variable transmission mechanism 8 is shiftable in both the case where the speed of stepwise variable transmission mechanism 9 is the forward first speed and the case where the speed of stepwise variable transmission mechanism 9 is the forward second speed. Further, region C shown in FIG. 3 is a region where continuously variable transmission mechanism 8 is shiftable only in a case where the speed of stepwise variable transmission mechanism 9 is the forward second speed.

In regions A-C, in a manner similar to the conventional art, target automatic transmission input rotation number $N_{i(0)}$ is determined in accordance with vehicle speed VSP and throttle opening degree TVO on the basis of the shift map shown in FIG. 3 and continuously variable transmission mechanism 8 is controlled so as to achieve target automatic transmission input rotation number $N_{i(0)}$. As a result, the transmission ratio can be non-stepwise controlled, that is, continuously controlled in continuously variable transmission mechanism 8. Hydraulic pressure control valve unit 10 and transmission controller 11 as shown in FIG. 2 correspond to continuously variable transmission control section 13 as shown in FIG. 1.

On the other hand, the shift lines in stepwise variable transmission mechanism 9 include 1→2 shift up line at which the forward first speed is shifted to the forward second speed, and 2→1 shift down line at which the forward second speed is shifted to the forward first speed. The forward first speed region and the forward second speed region in stepwise variable transmission mechanism 9 are determined by the 1→2 shift up line and the 2→1 shift down line.

For instance, in a case where a running state to be determined by vehicle speed VSP and throttle opening degree TVO is a running state in which the 1→2 shift up line is traversed from a low vehicle speed side toward a high vehicle speed side, low brake LR/B is brought into the disengagement state, and at the same time, high clutch H/C is brought into the engagement state such that stepwise variable transmission mechanism 9 selects the forward second speed.

In contrast, in a case where a running state to be determined by vehicle speed VSP and throttle opening degree TVO is a running state in which the 2→1 shift down line is traversed from the high vehicle speed side toward the low vehicle speed side, high clutch H/C is brought into the disengagement state, and at the same time, low brake LR/B is brought into the engagement state. Hydraulic pressure control valve unit 10 and transmission controller 11 as shown in FIG. 2 also correspond to stepwise variable transmission control section 14 as shown in FIG. 1.

By using the shift map shown in FIG. 3, vehicle speed VSP and throttle opening degree TVO can be calculated so that stepwise variable transmission mechanism 9 can select the forward first speed or the forward second speed in accordance with the calculated vehicle speed VSP and throttle opening degree TVO and, at the same time, continuously variable transmission mechanism 8 can perform continuous shift control in accordance with the calculated vehicle speed VSP and throttle opening degree TVO.

Further, automatic transmission system 4 cooperates the shift control of continuously variable transmission mechanism 8 with the shift control of stepwise variable transmission mechanism 9 by performing changeover shift in stepwise variable transmission mechanism 9 and, at the same time, performing the non-stepwise or continuous shift in continuously variable transmission mechanism 8. Such shift control of automatic transmission system 4 is called "cooperative shift control".

Figure 4:
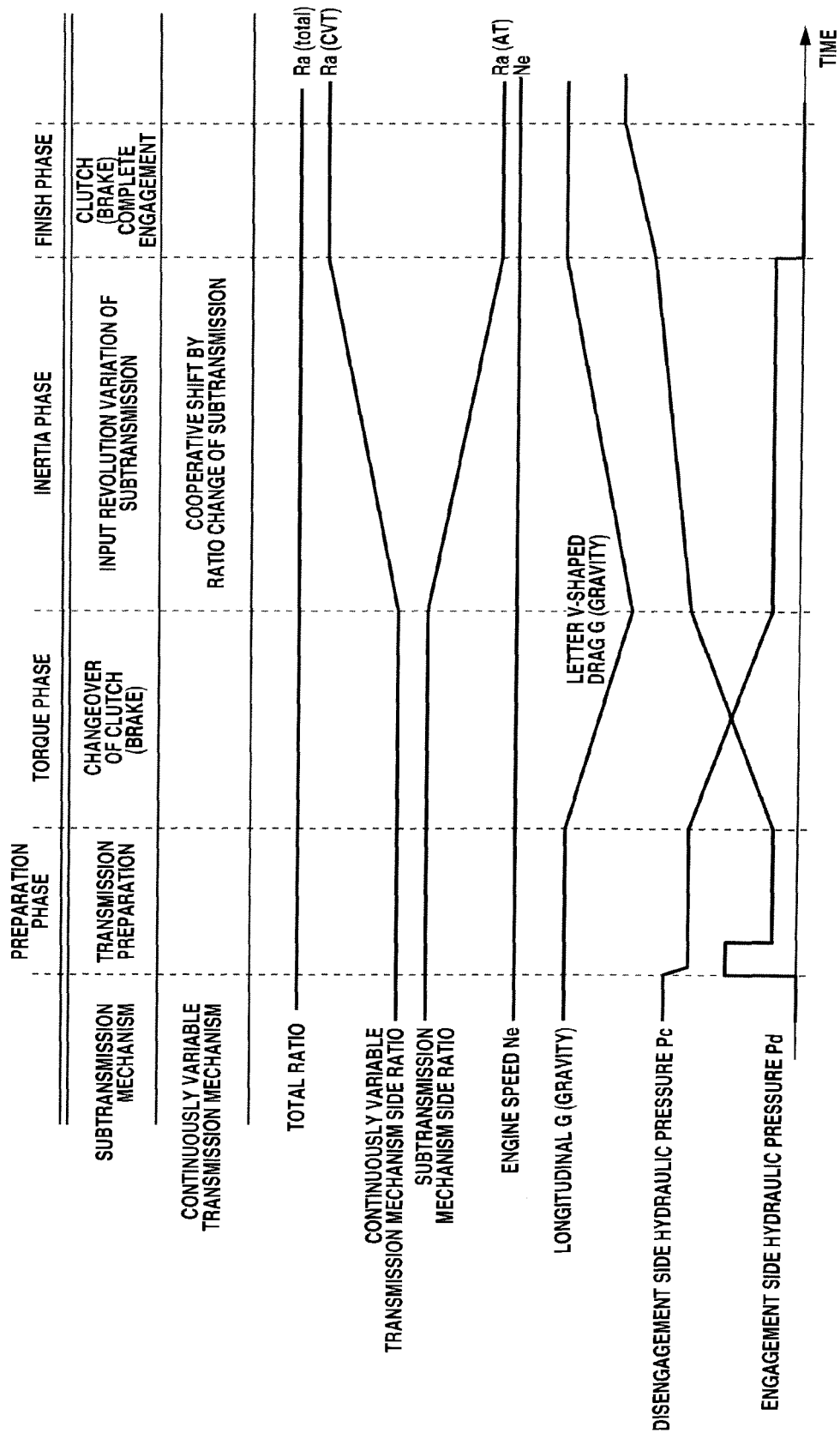
FIG. 4 is a timing chart showing a basic control flow of a stepwise variable transmission mechanism shown in FIG. 1.

FIG. 4 is a timing chart showing a basic control flow of stepwise variable transmission mechanism 9 shown in FIG. 1. As shown in FIG. 4, the cooperative shift control can realize smooth shift as if no change occurs in total transmission ratio of reduction mechanism 3 and automatic transmission system 4 (hereinafter referred to simply as "a total ratio"), by counterbalancing variation in transmission ratio of stepwise variable transmission mechanism 9 (hereinafter referred to as "a stepwise variable transmission side ratio") $Ra_{(AT)}$ which is caused by carrying out changeover of the speed in stepwise variable transmission mechanism 9 as a subtransmission, with variation in transmission ratio of continuously variable transmission mechanism 8 (hereinafter referred to as "a continuously variable transmission side ratio") $Ra_{(CVT)}$ which is caused by carrying out shift in continuously variable transmission mechanism 8. Here, the total ratio $Ra_{(total)}$ is defined as a value obtained by multiplying gear ratio $Ra_{(re)}$ of reduction mechanism 3, continuously variable transmission side ration $Ra_{(CVT)}$ and stepwise variable transmission side ratio $Ra_{(AT)}$ (i.e., $Ra_{(total)}=Ra_{(re)} \times Ra_{(CVT)} \times Ra_{(AT)}$).

Specifically, when the speed of stepwise variable transmission mechanism 9 (i.e., the subtransmission) is upshifted from the forward first speed to the forward second speed, automatic transmission system 4 can be shifted while keeping input rotation number $N_i$ of automatic transmission system 4 which is generated by both of transmission mechanisms 8 and 9, at a constant value, by downshifting continuously variable transmission mechanism 8 simultaneously with the upshift of stepwise variable transmission mechanism 9 (i.e., the subtransmission) as shown in FIG. 4. That is, in a case where the cooperative shift control is performed in automatic transmission system 4, it is possible to suppress inertia torque and shift shock which will occur upon upshifting stepwise variable transmission mechanism 9, and realize smooth shift as if it is performed by continuously variable transmission mechanism 8.

As described above, automatic transmission system 4 has the construction in which continuously variable transmission mechanism 8 capable of continuously varying the transmission ratio (for instance, continuously variable transmission CVT) and stepwise variable transmission mechanism 9 capable of selecting an optional speed from a plurality of speeds (for instance, so-called automatic transmission AT as a stepwise variable transmission) are in series connected with each other. With this construction, automatic transmission system 4 can realize a wide ratio coverage.

That is, the combination of continuously variable transmission mechanism (CVT) 8 and stepwise variable transmission mechanism (AT) 9 can provide a ratio coverage expanded relative to a ratio coverage that can be attained only by either one of continuously variable transmission mechanism (CVT) 8 and stepwise variable transmission mechanism (AT) 9. Further, automatic transmission system 4 performs shift of continuously variable transmission mechanism (CVT) 8 and shift of stepwise variable transmission mechanism (AT) 9 simultaneously, and performs the cooperative shift control that can realize a predetermined transmission ratio so as to suppress variation in total transmission ratio of continuously variable transmission mechanism (CVT) 8 and stepwise variable transmission mechanism (AT) 9.

Further, control section 12 has such a retardation processing function that when executing shift control of one of continuously variable transmission mechanism (CVT) 8 and stepwise variable transmission mechanism (AT) 9 which has a smaller response delay of an actual transmission ratio from a target transmission ratio than the other, the transmission mechanism having a smaller response delay is subjected to a retardation processing (or a delay processing). Specifically, in automatic transmission system 4 that has the serial arrangement of continuously variable transmission mechanism (CVT) 8 and stepwise variable transmission mechanism (AT) 9 in which the transmission mechanisms 8 and 9 are in series connected with each other, and performs the cooperative shift control as described above, in a case where the response of continuously variable transmission mechanism (CVT) 8 is delayed as compared to the response of stepwise variable transmission mechanism (AT) 9, the shift control of continuously variable transmission mechanism (CVT) 8 and the shift control of stepwise variable transmission mechanism (AT) 9 are respectively performed as follows upon power-on upshift.

<Shift Control of Stepwise Variable Transmission Mechanism (AT)>

The target stepwise variable transmission ratio is first set, and then subjected to a retardation processing (or a delay processing) to set a retardation-processed target stepwise variable transmission ratio. Then, shift control of the stepwise variable transmission mechanism is performed on the basis of the thus set retardation-processed target stepwise variable transmission ratio.

<Shift Control of Continuously Variable Transmission Mechanism (CVT)>

The target continuously variable transmission ratio is set on the basis of the target stepwise variable transmission ratio set in the shift control of the stepwise variable transmission mechanism and a total target transmission ratio of the stepwise variable transmission mechanism and the continuously variable transmission mechanism. Then, shift control of the continuously variable transmission mechanism is performed on the basis of the thus set target continuously variable transmission ratio.

Next, a method of controlling the automatic transmission system according to the first embodiment is explained. In a case where it is determined that an inertia phase shift cooperation starts during the shift operation of the stepwise variable transmission mechanism of the automatic transmission system, the target stepwise variable transmission ratio is produced so as to cause smooth transition from a pre-shift gear ratio (i.e., a gear ratio before the shift) to a post-shift gear ratio (i.e., a gear ratio after the shift). That is, the determination acts as a trigger for the smooth transition of the target stepwise variable transmission ratio.

Further, the target continuously variable transmission ratio (i.e., a control target continuously variable transmission ratio) is produced from the thus produced target stepwise variable transmission ratio and the total target transmission ratio that is produced from general information including vehicle speed, accelerator opening degree and the like. That is, the target continuously variable transmission ratio is produced by the formula: (target continuously variable transmission ratio)= (total target transmission ratio)/(target stepwise variable transmission ratio) which is derived from the formula: (total transmission ratio)=(continuously variable transmission ratio)×(stepwise variable transmission ratio). Then, continuously variable transmission control section 13 and stepwise variable transmission control section 14 perform the shift control so as to realize the respective target transmission ratios, i.e., the continuously variable transmission ratio and the stepwise variable transmission ratio.

In this case, even during non-shift operation of stepwise variable transmission mechanism (AT) 9, it is also possible to produce the target continuously variable transmission ratio at a target continuously variable transmission ratio producing block (i.e., continuously variable transmission control section 13) by using the target stepwise variable transmission ratio as a gear ratio at the current speed. Therefore, a simple construction of the control system can be achieved.

Meanwhile, continuously variable transmission mechanism (CVT) 8 and stepwise variable transmission mechanism (AT) 9 have response properties relative to the target transmission ratio which are different from each other. The difference between the response properties causes variation in total transmission ratio. Therefore, the timing of the shift control of one of the transmission mechanisms which has a smaller response delay is conformed to the timing of the shift control of the other transmission mechanism having a larger response delay by subjecting the target transmission ratio of the one transmission mechanism to the retardation processing to retard (or delay) the shift control of the one transmission mechanism. As a result, it is possible to suppress variation in total transmission ratio.

For instance, in a case where the response of continuously variable transmission mechanism (CVT) 8 is delayed as compared to the response of stepwise variable transmission mechanism (AT) 9, the retardation processing is executed for retarding (or delaying) the shift control of stepwise variable transmission mechanism (AT) 9 which is to be performed according to the target transmission ratio to thereby absorb the difference in response property between continuously variable transmission mechanism (CVT) 8 and stepwise variable transmission mechanism (AT) 9. The retardation processing may be carried out, for example, by the method in which a difference in waste time of the response delay between continuously variable transmission mechanism (CVT) 8 and stepwise variable transmission mechanism (AT) 9 is used, or a primary filter having a time constant corresponding to a difference in response time constant which is approximate to a first-order lag is used.

Figure 5:
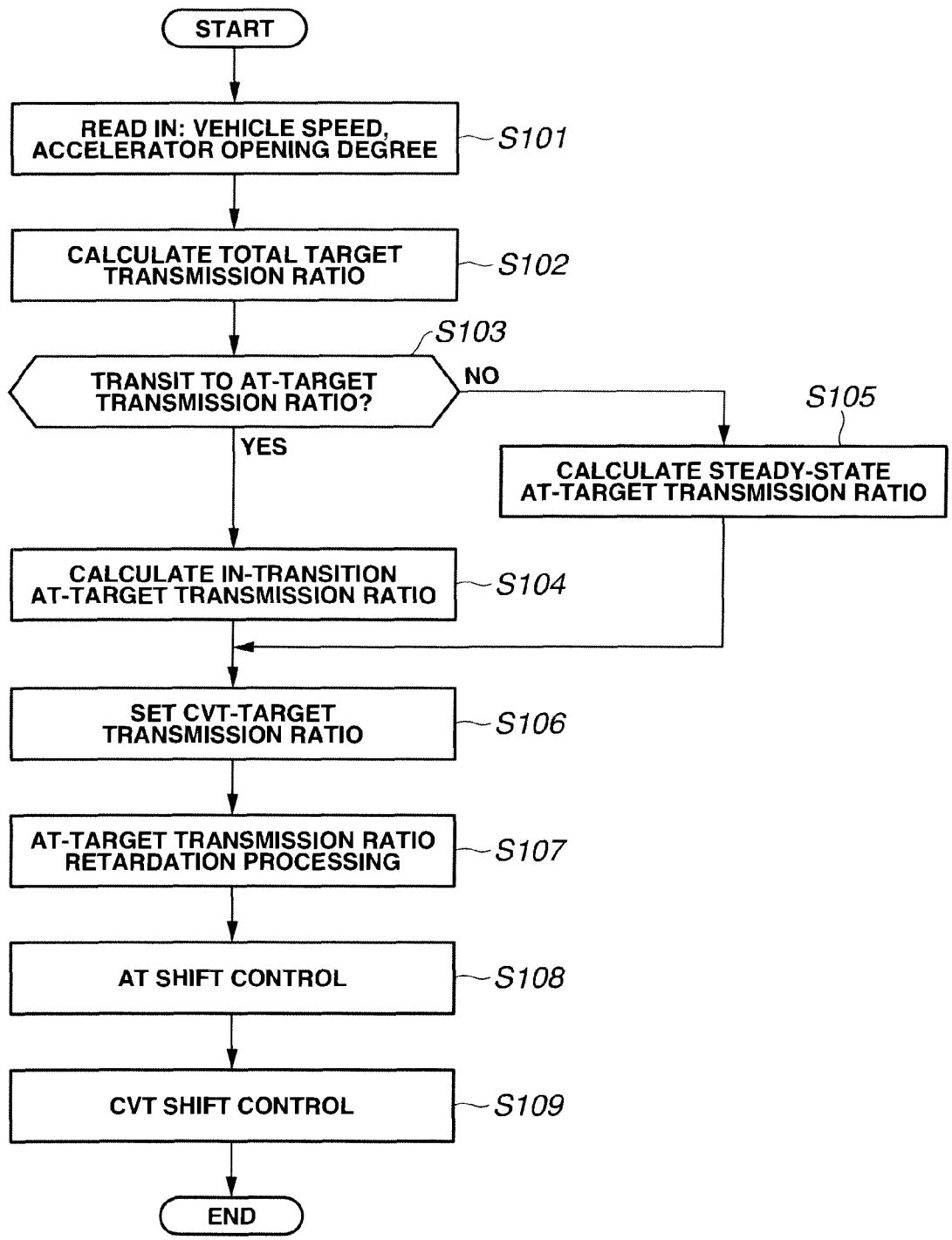
FIG. 5 is a flowchart showing a routine of the control of the automatic transmission system according to the first embodiment which is carried out in a case where a response of a continuously variable transmission mechanism is delayed as compared to a response of the stepwise variable transmission mechanism.

Next, a method of controlling automatic transmission system 4 in a case where the response of continuously variable transmission mechanism (CVT) 8 is delayed as compared to the response of stepwise variable transmission mechanism (AT) 9 is explained by referring to FIG. 5. FIG. 5 is a flowchart showing a routine of the control of automatic transmission system 4 according to the first embodiment of the present invention which is carried out in a case where the response of continuously variable transmission mechanism (CVT) 8 is delayed as compared to the response of stepwise variable transmission mechanism (AT) 9. As shown in FIG. 5, logic flow starts and goes to step S101 where vehicle speed and accelerator opening degree are read-in during running of the vehicle with automatic transmission system 4. The logic flow then proceeds to step S102. In step S102, a total target transmission ratio is calculated on the basis of the read-in vehicle speed and the read-in accelerator opening degree.

Subsequently, in step S103, on the basis of the thus calculated total target transmission ratio, it is determined whether transition to the shift control of stepwise variable transmission mechanism (AT) 9 based on an AT target transmission ratio of stepwise variable transmission mechanism (AT) 9 is to be made. That is, in step S103, it is determined whether transition (or shift) to the AT target transmission ratio is to be made. When the answer in step S103 is YES, indicating that the transition to the AT target transmission ratio is to be made, the logic flow proceeds to step S104 where an in-transition AT target transmission ratio that is used during the transition to the shift control of stepwise variable transmission mechanism (AT) 9 is calculated. On the other hand, when the answer in step S103 is NO, indicating that the transition to the AT target transmission ratio is not to be made, the logic flow goes to step S105 where a steady-state AT target transmission ratio is calculated. The logic flow then proceeds to step S106 where a CVT target transmission ratio of continuously variable transmission mechanism (CVT) 8 is set.

The logic flow then proceeds to step S107 where an AT target transmission ratio retardation processing for retarding (or delaying) the transition to the AT target transmission ratio is executed. Subsequently, in step S108, AT shift control based on the AT target transmission ratio retardation processing is performed. In step S109, CVT shift control according to the CVT target transmission ratio is performed. The logic flow is then ended.

Figure 6:
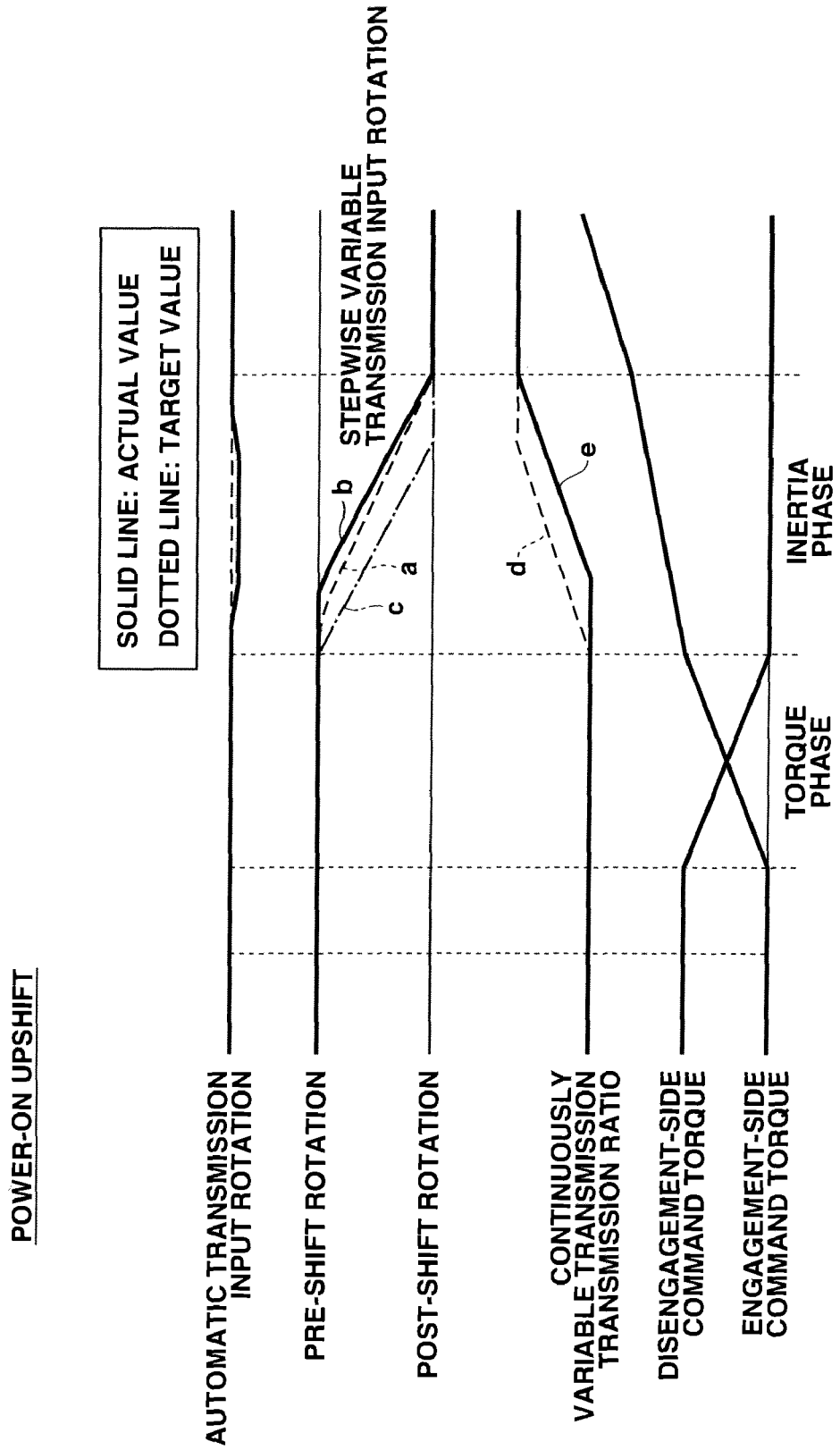
FIG. 6 is a timing chart showing the control of the automatic transmission system according to the first embodiment which is carried out in a case where a response of the continuously variable transmission mechanism is delayed as compared to a response of the stepwise variable transmission mechanism.

FIG. 6 is a timing chart showing the control of automatic transmission system 4 in the first embodiment which is carried out in a case where the response of continuously variable transmission mechanism (CVT) 8 is delayed as compared to the response of stepwise variable transmission mechanism (AT) 9. As shown in FIG. 6, upon power-on upshift for upshifting stepwise variable transmission mechanism (AT) 9, the AT shift control of stepwise variable transmission mechanism (AT) 9 which is based on the AT target transmission ratio retardation processing is performed at the start of an inertia phase, that is, at the time at which a torque phase in which an engagement-side command torque is increased and a disengagement-side command torque is decreased is shifted to the inertia phase in which the disengagement-side command torque becomes zero and the engagement-side command torque reaches a predetermined value and then increases.

With the AT shift control based on the AT target transmission ratio retardation processing, the rotation number of stepwise variable transmission mechanism (AT) 9 is set to vary from the pre-shift value along line "a" as shown in FIG. 6 which is determined as a target value on the basis of the retardation-processed AT target transmission ratio set by the AT target transmission ratio retardation processing. However, actually, the rotation number of stepwise variable transmission mechanism (AT) 9 is varied along line "b" in FIG. 6 due to the response delay of stepwise variable transmission mechanism (AT) 9. The actual post-shift value of the rotation number of stepwise variable transmission mechanism (AT) 9 obtained via line "b" serves as the input rotation number of stepwise variable transmission mechanism (AT) 9. Corresponding to the above variation in the rotation number of stepwise variable transmission mechanism (AT) 9, the rotation number of continuously variable transmission mechanism (CVT) 8 having a larger response delay than that of stepwise variable transmission mechanism (AT) 9 is set to vary along line "d" as shown in FIG. 6 which is determined as a target value on the basis of the total target transmission ratio and the non-retarded AT target transmission ratio "c" before being subjected to the AT target transmission ratio retardation processing. However, actually, the rotation number of continuously variable transmission mechanism (CVT) 8 is varied along line "e" as shown in FIG. 6 due to the response delay of continuously variable transmission mechanism (CVT) 8.

As explained above, in a case where the response of continuously variable transmission mechanism (CVT) 8 has a larger response delay than the response of stepwise variable transmission mechanism (AT) 9, it is possible to absorb the difference in response property between continuously variable transmission mechanism (CVT) 8 and stepwise variable transmission mechanism (AT) 9 by retarding the transition (or shift) to the target transmission ratio of stepwise variable transmission mechanism (AT) 9 (i.e., the smaller response delay side transmission mechanism) so as to conform with the shift control of continuously variable transmission mechanism (CVT) 8 (i.e., the larger response delay side transmission mechanism). As a result, the actual value of the automatic transmission input rotation number is allowed to approach to or substantially equal to the target value thereof as shown in FIG. 6. Further, variation in total transmission ratio of continuously variable transmission mechanism (CVT) 8 and stepwise variable transmission mechanism (AT) 9 can be suppressed by performing the shift control of continuously variable transmission mechanism (CVT) 8 in accordance with variation in transmission ratio of stepwise variable transmission mechanism (AT) 9.

The AT target value (i.e., the AT target transmission ratio) that is calculated during the transition to the target transmission ratio of stepwise variable transmission mechanism (AT) 9 is always calculated (for instance, the first speed gear ratio at the first speed) even in a phase other than the inertia phase, and produced to make smooth transition from the pre-shift gear ratio to the post-shift gear ratio subsequent to the start of the inertia phase. Accordingly, the time at which the transition to the AT target transmission ratio is started is not limited to the time of the start of the inertia phase. By executing the determination of transition (or shift) to the AT target transmission ratio in advance by an amount of the response delay of the larger response delay side transmission mechanism, it is possible to attain the same effect as obtained in a case where the transition (or shift) to the target transmission ratio of the larger response delay side transmission mechanism is advanced.

Figure 7:
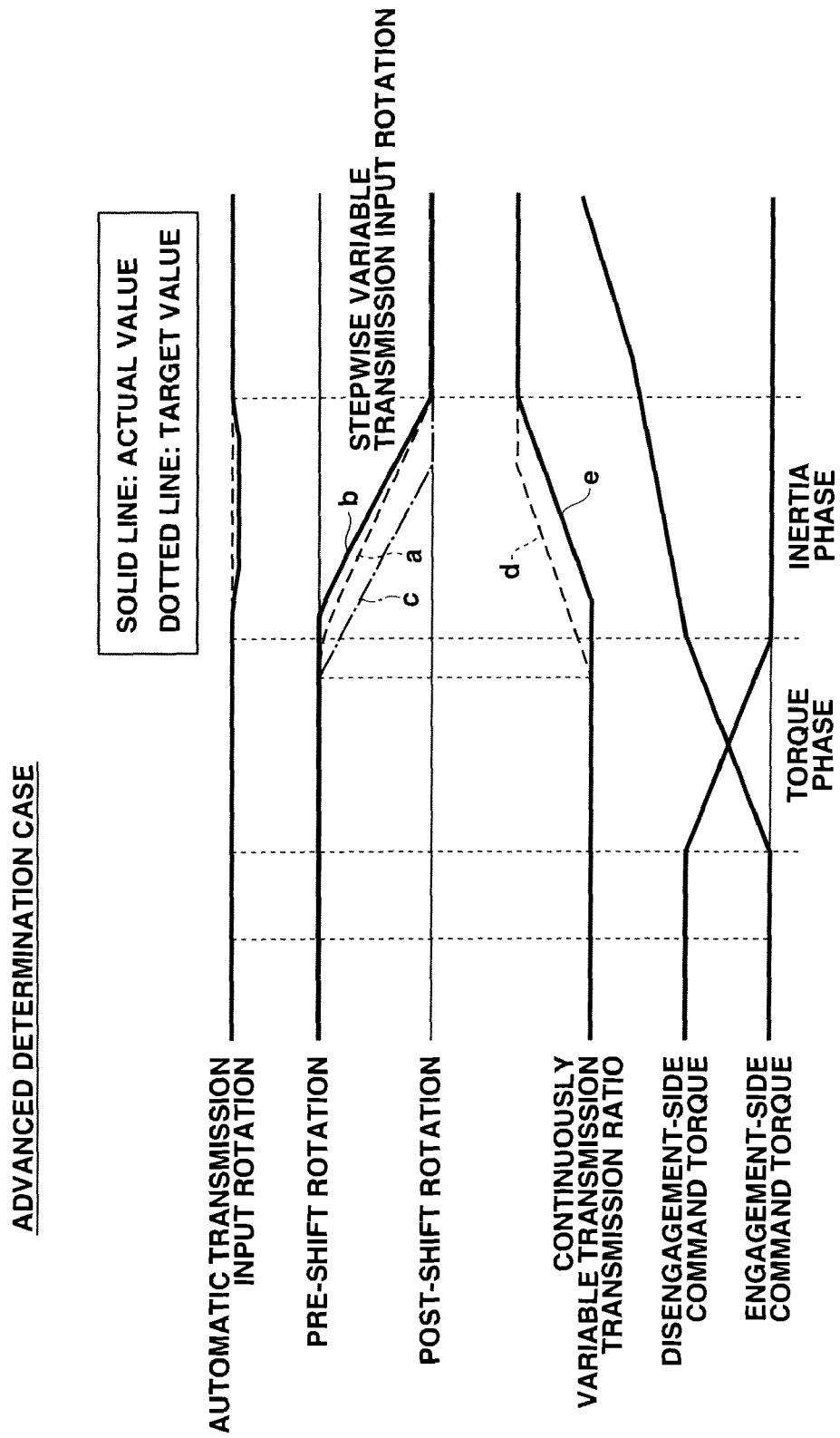
FIG. 7 is a timing chart showing a relationship between input rotation number and transmission ratio in the control method of the automatic transmission system according to a modification of the first embodiment in a case where execution of a transition determination is advanced by an amount of delay of the response of one of the continuously variable transmission mechanism and the stepwise variable transmission mechanism which is delayed as compared to the response of the other.

Referring to FIG. 7, a modification of the first embodiment of the present invention is explained. In the modification, a determination of transition (or shift) to the target transmission ratio of the smaller response delay side transmission mechanism (i.e., the AT target transmission ratio) is made in advance by an amount of the response delay of the larger response delay side transmission mechanism (i.e., continuously variable transmission mechanism (CVT) 8). FIG. 7 is a timing chart showing a relationship between input rotation number and transmission ratio in the control method of automatic transmission system 4 in the modification of the first embodiment in a case where the transition determination is advanced by an amount of the response delay of the larger response delay side transmission mechanism. As shown in FIG. 7, when executing the advanced determination in which the determination of transition to the target transmission ratio of the smaller response delay side transmission mechanism (i.e., the AT target transmission ratio) is advanced by an amount of the response delay of the larger response delay side transmission mechanism (i.e., continuously variable transmission mechanism (CVT) 8), the AT shift control of stepwise variable transmission mechanism (AT) 9 which is based on the advanced determination is performed during the torque phase prior to the inertia phase.

With the AT shift control based on the advanced determination, the rotation number of stepwise variable transmission mechanism (AT) 9 is set to vary from the pre-shift value along line "a" as shown in FIG. 7 which is determined as a target value on the basis of the retardation-processed AT target transmission ratio set by the AT target transmission ratio retardation processing. As indicated by line "a", the timing of start of the transition to the retardation-processed AT target transmission ratio is advanced by the amount of response delay of the larger response delay side transmission mechanism (i.e., continuously variable transmission mechanism (CVT) 8), that is, the transition to the AT target transmission ratio is started during the torque phase. However, actually, the rotation number of stepwise variable transmission mechanism (AT) 9 is varied along line "b" as shown in FIG. 7 due to the response delay of stepwise variable transmission mechanism (AT) 9. The actual post-shift rotation number of stepwise variable transmission mechanism (AT) 9 obtained via line "b" serves as the input rotation number of stepwise variable transmission mechanism (AT) 9. Corresponding to the above variation in the rotation number of stepwise variable transmission mechanism (AT) 9, the rotation number of continuously variable transmission mechanism (CVT) 8 having a larger response delay than that of stepwise variable transmission mechanism (AT) 9 is set to vary along line "d" as shown in FIG. 7 which is determined as a target value on the basis of the total target transmission ratio and the non-retarded AT target transmission ratio "c" before being subjected to the AT target transmission ratio retardation processing. As indicated by line "d", the CVT target transmission ratio is advanced by the amount of response delay of continuously variable transmission mechanism (CVT) 8. However, actually, the rotation number of continuously variable transmission mechanism (CVT) 8 is varied along line "e" as shown in FIG. 7 due to the response delay of continuously variable transmission mechanism (CVT) 8.

As described above, in a case where continuously variable transmission mechanism (CVT) 8 is delayed in response as compared to stepwise variable transmission mechanism (AT) 9, setting of the respective target values of stepwise variable transmission mechanism (AT) 9 and continuously variable transmission mechanism (CVT) 8 is started in advance by the response delay thereof during the torque phase without waiting for start of the inertia phase. As the result, as shown in FIG. 7, the actual value of the input rotation number of automatic transmission system 4 can become closer to or substantially the same as the target value thereof. Therefore, it is possible to suppress variation in total transmission ratio of stepwise variable transmission mechanism (AT) 9 and continuously variable transmission mechanism (CVT) 8 and reduce the shift time.

As explained above, the control apparatus for the automatic transmission system including the continuously variable transmission mechanism and the stepwise variable transmission mechanism according to the first embodiment and the modification, is constructed to set a target transmission ratio of one of the transmission mechanisms which has a smaller response delay than that of the other transmission mechanism, and then control the one transmission mechanism having the smaller response delay on the basis of a retardation-processed target transmission ratio that is set by subjecting the set target transmission ratio to a retardation processing. The control apparatus is also constructed to set a target transmission ratio of the other transmission mechanism having a larger response delay on the basis of (a): a target transmission ratio of the other transmission mechanism which is set before subjecting the set target transmission ratio of the one transmission mechanism to the retardation processing and (b): a total target transmission ratio of the stepwise variable transmission mechanism and the continuously variable transmission mechanism; and then control the other transmission mechanism on the basis of the thus set target transmission ratio of the other transmission mechanism.

It is possible to suppress occurrence of a difference in response delay between the smaller response delay side transmission mechanism and the larger response delay side transmission mechanism by executing the retardation processing for retarding (or delaying) the transition (or shift) to the target transmission ratio of the smaller response delay side transmission mechanism. Therefore, it is possible to suppress variation in total transmission ratio of the transmission mechanisms during the cooperative shift control.

Second Embodiment

In the second embodiment, in automatic transmission system 4 that has the serial arrangement of continuously variable transmission mechanism (CVT) 8 and stepwise variable transmission mechanism (AT) 9 and performs the cooperative shift control as described above, in a case where the response of stepwise variable transmission mechanism (AT) 9 is delayed as compared to the response of continuously variable transmission mechanism (CVT) 8, the shift control of continuously variable transmission mechanism (CVT) 8 and the shift control of stepwise variable transmission mechanism (AT) 9 are respectively performed as follows.

<Shift Control of Stepwise Variable Transmission Mechanism (AT)>

The target stepwise variable transmission ratio is set, and then shift control of the stepwise variable transmission mechanism is performed on the basis of the set target stepwise variable transmission ratio.

<Shift Control of Continuously Variable Transmission Mechanism (CVT)>

The target stepwise variable transmission ratio set above is subjected to a retardation processing to set a retardation-processed target stepwise variable transmission ratio, and then a target continuously variable transmission ratio is set on the basis of the thus set retardation-processed target stepwise variable transmission ratio and a total target transmission ratio of the stepwise variable transmission mechanism and the continuously variable transmission mechanism. Then, shift control of the continuously variable transmission mechanism is performed on the basis of the thus set target continuously variable transmission ratio.

Next, a method of controlling the automatic transmission system according to the second embodiment is explained. In automatic transmission system 4 having the serial connection of continuously variable transmission mechanism (CVT) 8 and stepwise variable transmission mechanism (AT) 9, the control method aims to suppress variation in input rotation number during the stepwise variable shift operation by subjecting continuously variable transmission mechanism (CVT) 8 to the shift cooperation during the inertia phase of the stepwise variable transmission shift operation. Therefore, in the control method of the second embodiment, the difference in response property between continuously variable transmission mechanism (CVT) 8 and stepwise variable transmission mechanism (AT) 9 only during the inertia phase is taken into consideration.

For instance, in a case where the response of stepwise variable transmission mechanism (AT) 9 is delayed as compared to the response of continuously variable transmission mechanism (CVT) 8, if the target continuously variable transmission ratio that is produced by the formula: (target continuously variable transmission ratio)=(total target transmission ratio)/(target stepwise variable transmission ratio), is subjected to the retardation processing by using the difference in waste time or the filter as described in the first embodiment, retardation in transition of the target continuously variable transmission ratio to the target value will be caused even during non-stepwise variable shift or even in a case except for the cooperative shift in the inertia phase of the stepwise variable shift. As a result, the total transmission ratio of the stepwise variable transmission mechanism and the continuously variable transmission mechanism will be inconsistent with the total target transmission ratio of the stepwise variable transmission mechanism and the continuously variable transmission mechanism.

If the target continuously variable transmission ratio is subjected to the retardation processing only in the inertia phase of stepwise variable transmission mechanism (AT) 9 in order to avoid the above-described problem, it will be necessary to determine start and end of the inertia phase of stepwise variable transmission mechanism (AT) 9, thereby complicating the control system. Further, it will be also necessary to transit from the retardation processing state in which the retardation processing for the target continuously variable transmission ratio is executed to the usual state in which the retardation processing is not executed, at the end of the inertia phase of stepwise variable transmission mechanism (AT) 9. At this time, in a case where the retardation-processed target continuously variable transmission ratio has not reached the target value to be achieved at the end of the inertia phase of stepwise variable transmission mechanism (AT) 9, there will occur a gap from the target value. In this case, an additional processing to eliminate the gap will be needed.

In order to avoid the above-described problems, in the control method of the second embodiment, in a case where the response of stepwise variable transmission mechanism (AT) 9 is delayed as compared to the response of continuously variable transmission mechanism (CVT) 8, the target continuously variable transmission ratio is calculated by the formula: (target continuously variable transmission ratio)=(total target transmission ratio)/(retardation-processed target stepwise variable transmission ratio), instead of the formula: (target continuously variable transmission ratio)=(total target transmission ratio)/(target stepwise variable transmission ratio). Here, the retardation-processed target stepwise variable transmission ratio is set on the basis of a difference in response between continuously variable transmission mechanism (CVT) 8 and stepwise variable transmission mechanism (AT) 9.

As a result, it is possible to consider the difference in response delay between continuously variable transmission mechanism (CVT) 8 and stepwise variable transmission mechanism (AT) 9 only upon the shift cooperation in the inertia phase without executing the determination of start and end of the inertia phase. It is also possible to produce the target continuously variable transmission ratio in the same target producing manner even during non-stepwise variable shift, resulting in the simplified control system.

Figure 8:
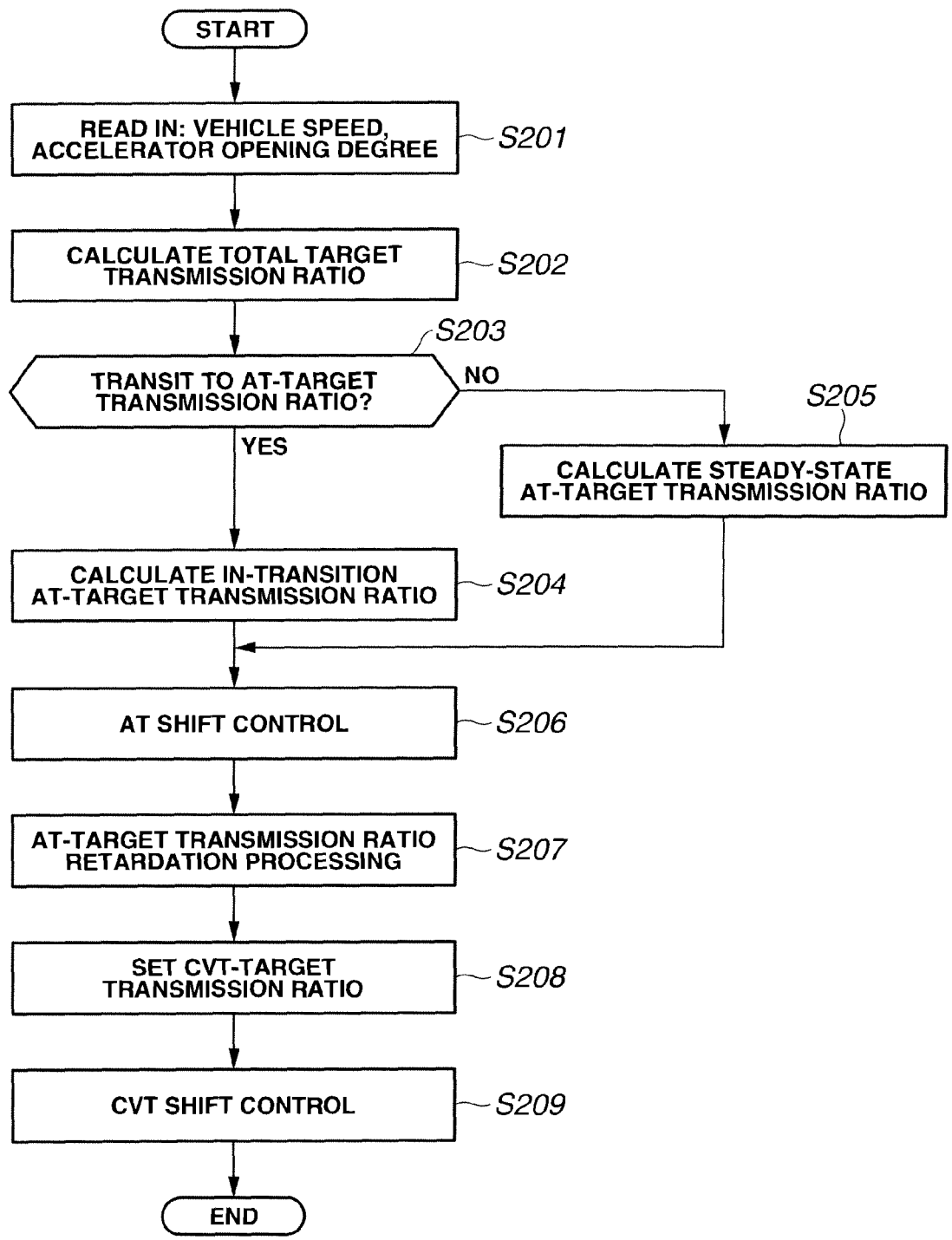
FIG. 8 is a flowchart showing a routine of the control of the automatic transmission system according to a second embodiment which is carried out in a case where a response of the stepwise variable transmission mechanism is delayed as compared to a response of the continuously variable transmission mechanism.

Next, the method of controlling automatic transmission system 4 according to the second embodiment in which the response of stepwise variable transmission mechanism (AT) 9 is delayed as compared to the response of continuously variable transmission mechanism (CVT) 8, is explained by referring to FIG. 8. FIG. 8 is a flowchart showing a routine of the control of automatic transmission system 4 in the second embodiment which is carried out in a case where the response of stepwise variable transmission mechanism (AT) 9 is delayed as compared to the response of continuously variable transmission mechanism (CVT) 8. As shown in FIG. 8, logic flow starts and goes to step S201 where vehicle speed and accelerator opening degree are read in during running of the vehicle with automatic transmission system 4. The logic flow then proceeds to step S202 in which a total target transmission ratio of continuously variable transmission mechanism (CVT) 8 and stepwise variable transmission mechanism (AT) 9 is calculated on the basis of the read-in vehicle speed and the read-in accelerator opening degree.

Subsequently, in step S203, on the basis of the thus calculated total target transmission ratio, it is determined whether transition (or shift) to an AT target transmission ratio of stepwise variable transmission mechanism (AT) 9 is to be made. When the answer in step S203 is YES, indicating that the transition to the AT target transmission ratio is to be made, the logic flow proceeds to step S204 where an in-transition AT target transmission ratio that is an AT target transmission ratio to be used during the transition is calculated. On the other hand, when the answer in step S203 is NO, indicating that the transition to the AT target transmission ratio is not to be made, the logic flow goes to step S205 where a steady-state AT target transmission ratio is calculated. The logic flow then proceeds to step S206 where AT shift control is performed on the basis of the calculated AT target transmission ratio.

The logic flow then proceeds to step S207 where an AT target transmission ratio retardation processing for retarding the transition to the AT target transmission ratio is executed to set a retardation-processed AT target transmission ratio. Subsequently, in step S208, a CVT target transmission ratio of continuously variable transmission mechanism (CVT) 8 is set on the basis of the retardation-processed AT target transmission ratio set by the AT target transmission ratio retardation processing. In step S209, CVT shift control is performed on the basis of the set CVT target transmission ratio. The logic flow is then ended.

Figure 9:
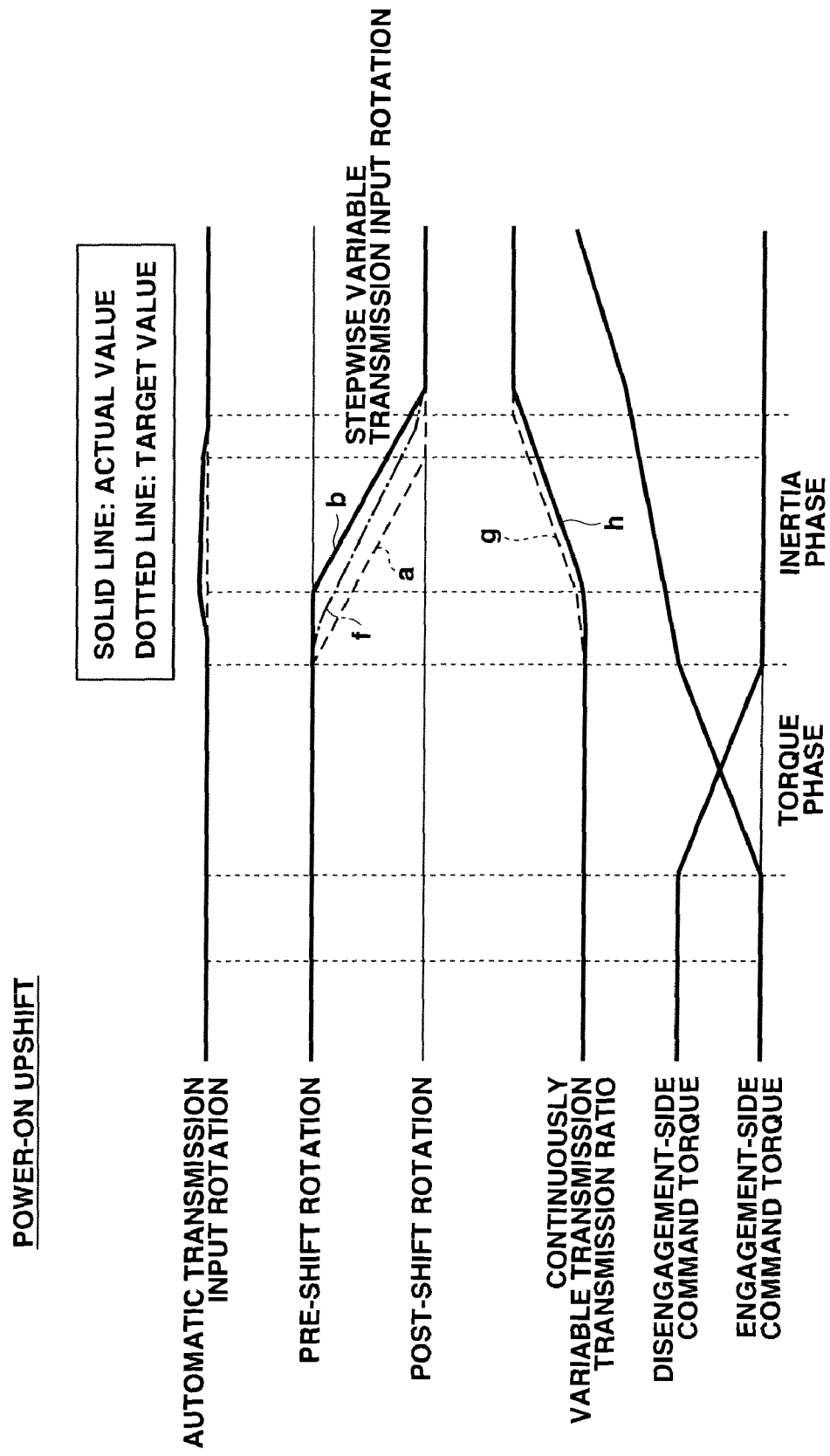
FIG. 9 is a timing chart showing the control of the automatic transmission system according to the second embodiment which is carried out in a case where a response of the stepwise variable transmission mechanism is delayed as compared to a response of the continuously variable transmission mechanism.

FIG. 9 is timing chart showing the control of automatic transmission system 4 according to the second embodiment which is carried out in a case where the response of stepwise variable transmission mechanism (AT) 9 is delayed as compared to the response of continuously variable transmission mechanism (CVT) 8. As shown in FIG. 9, upon power-on upshift for upshifting stepwise variable transmission mechanism (AT) 9, the AT shift control of stepwise variable transmission mechanism (AT) 9 is performed at the start of an inertia phase, that is, at the time at which the torque phase is shifted to the inertia phase.

With the above AT shift control, the rotation number of stepwise variable transmission mechanism (AT) 9 is set to vary from the pre-shift value along line "a" as shown in FIG. 9 which is determined as a target value on the basis of the AT target transmission ratio calculated prior to execution of the AT target transmission ratio retardation processing. However, actually, the rotation number of stepwise variable transmission mechanism (AT) 9 is varied along line "b" due to the response delay of stepwise variable transmission mechanism (AT) 9. The actual post-shift value of the rotation number of stepwise variable transmission mechanism (AT) 9 obtained via line "b" serves as the input rotation number of stepwise variable transmission mechanism (AT) 9. Corresponding to the above variation in the rotation number of stepwise variable transmission mechanism (AT) 9, the rotation number of continuously variable transmission mechanism (CVT) 8 having a smaller response delay than that of stepwise variable transmission mechanism (AT) 9 is set to vary along line "g" as shown in FIG. 9 which is determined as a target value on the basis of the total target transmission ratio and the retardation-processed AT target transmission ratio "f" that is set by the AT target transmission ratio retardation processing on the basis of the response difference between continuously variable transmission mechanism (CVT) 8 and stepwise variable transmission mechanism (AT) 9. However, actually, the rotation number of continuously variable transmission mechanism (CVT) 8 is varied along line "h" due to the response delay of continuously variable transmission mechanism (CVT) 8.

As explained above, the control apparatus for the automatic transmission system including a continuously variable transmission mechanism and a stepwise variable transmission mechanism, according to the second embodiment, is configured to set a target transmission ratio of one of the continuously variable transmission mechanism and the stepwise variable transmission mechanism which has a larger response delay than that of the other transmission mechanism, and then control the larger response delay side transmission mechanism on the basis of the set target transmission ratio thereof. On the other hand, the control apparatus is also configured to set a control target transmission ratio of the smaller response delay side transmission mechanism on the basis of a total target transmission ratio of the continuously variable transmission mechanism and the stepwise variable transmission mechanism and a retardation-processed target transmission ratio which is set by subjecting the set target transmission ratio of the larger response delay side transmission mechanism to a retardation processing, and then control the smaller response delay side transmission mechanism on the basis of the thus set control target transmission ratio.

In the second embodiment, by executing the retardation processing relative to the target transmission ratio of the one of the continuously variable transmission mechanism and the stepwise variable transmission mechanism which has a larger response delay, it is possible to suppress occurrence of a difference in response delay between the continuously variable transmission mechanism and the stepwise variable transmission mechanism and thereby suppress variation in the total transmission ratio during the cooperative shift control.

The control apparatus and method according to the above-described embodiments and modification of the present invention can attain the following effects. Even in a case where the stepwise variable transmission mechanism and the continuously variable transmission mechanism of the automatic transmission system respectively have a response delay of the actual transmission ratio from the target transmission ratio, one of the stepwise variable transmission mechanism and the continuously variable transmission mechanism which has a smaller response delay than that of the other thereof can be controlled on the basis of a retardation-processed target transmission ratio obtained by a retardation processing. As a result, occurrence of a difference in response delay between the smaller response delay side transmission mechanism and the larger response delay side transmission mechanism can be suppressed, thereby preventing variation in total transmission ratio of the transmission mechanisms during the cooperative shift control.

This application is based on a prior Japanese Patent Application No. 2009-048484 filed on Mar. 2, 2009. The entire contents of the Japanese Patent Application No. 2009-048484 is hereby incorporated by reference.

Although the present invention has been described above by reference to certain embodiments and the modification of the present invention, the present invention is not limited to the embodiments and the modification as described above. Variations of the embodiments and the modification described above will occur to those skilled in the art in light of the above teachings. The scope of the present invention is defined with reference to the following claims.

What is claimed is:

1. A control apparatus for an automatic transmission system including a serial arrangement of a stepwise variable automatic transmission mechanism capable of selecting an optional speed from a plurality of speeds, and a continuously variable automatic transmission mechanism capable of continuously varying a transmission ratio thereof, the control apparatus being disposed in the automatic transmission system and performing a shift control of the continuously variable automatic transmission mechanism in accordance with variation in a transmission ratio of the stepwise variable automatic transmission mechanism, the control apparatus comprising:

a control section configured to execute shift control of the continuously variable automatic transmission mechanism and the stepwise variable automatic transmission mechanism, wherein the control section is further configured to execute a retardation processing which retards one of the continuously variable automatic transmission mechanism and the stepwise variable automatic transmission mechanism which has a smaller response delay of an actual transmission ratio from a target transmission ratio than that of the other of the continuously variable automatic transmission mechanism and the stepwise variable automatic transmission mechanism so as to absorb a difference in response between the continuously variable automatic transmission mechanism and the stepwise variable automatic transmission mechanism upon shift control of the one of the continuously variable automatic transmission mechanism and the stepwise variable automatic transmission mechanism.

2. The control apparatus as claimed in claim 1, wherein the control section is configured to:
set a target transmission ratio of the one of the continuously variable automatic transmission mechanism and the stepwise variable automatic transmission mechanism which has the smaller response delay than that of the other of the continuously variable automatic transmission mechanism and the stepwise variable automatic transmission mechanism;
control the one of the continuously variable automatic transmission mechanism and the stepwise variable automatic transmission mechanism which has the smaller response delay than that of the other of the continuously variable automatic transmission mechanism and the stepwise variable automatic transmission mechanism, on a basis of a retardation-processed target transmission ratio that is set by subjecting the set target transmission ratio to the retardation processing; and
control the other of the continuously variable automatic transmission mechanism and the stepwise variable automatic transmission mechanism which has a larger response delay than that of the one of the continuously variable automatic transmission mechanism and the stepwise variable automatic transmission mechanism, on a basis of a control target transmission ratio that is set on a basis of:
(a) the set target transmission ratio before being subjected to the retardation processing, and
(b) a total target transmission ratio of the continuously variable automatic transmission mechanism and the stepwise variable automatic transmission mechanism.

3. The control apparatus as claimed in claim 1, wherein the control section is configured to:
set a target transmission ratio of the other of the continuously variable automatic transmission mechanism and the stepwise variable automatic transmission mechanism which has a larger response delay than that of the one of the continuously variable automatic transmission mechanism and the stepwise variable automatic transmission mechanism;
control the other of the continuously variable automatic transmission mechanism and the stepwise variable automatic transmission mechanism which has the larger response delay than that of the one of the continuously variable automatic transmission mechanism and the stepwise variable automatic transmission mechanism, on a basis of the set target transmission ratio; and
control the one of the continuously variable automatic transmission mechanism and the stepwise variable automatic transmission mechanism which has the smaller response delay than that of the other of the continuously variable automatic transmission mechanism and the stepwise variable automatic transmission mechanism, on a basis of a control target transmission ratio that is set on a basis of:
(a) a retardation-processed target transmission ratio that is set by subjecting the set target transmission ratio of the other of the continuously variable automatic transmission mechanism and the stepwise variable automatic transmission mechanism which has the larger response delay than that of the one of the continuously variable automatic transmission mechanism and the stepwise variable automatic transmission mechanism, to the retardation processing, and
(b) a total target transmission ratio of the continuously variable automatic transmission mechanism and the stepwise variable automatic transmission mechanism.

4. The control apparatus as claimed in claim 2, wherein the control section is further configured to make a determination of transition to the set target transmission ratio of the one of the continuously variable automatic transmission mechanism and the stepwise variable automatic transmission mechanism which has the smaller response delay than that of the other of the continuously variable automatic transmission mechanism and the stepwise variable automatic transmission mechanism, in advance by an amount of the larger response delay of the other of the continuously variable automatic transmission mechanism and the stepwise variable automatic transmission mechanism.

5. The control apparatus as claimed in claim 2, wherein the one of the continuously variable automatic transmission mechanism and the stepwise variable automatic transmission mechanism which has the smaller response delay than that of the other of the continuously variable automatic transmission mechanism and the stepwise variable automatic transmission mechanism is the stepwise variable automatic transmission mechanism, and
wherein the other of the continuously variable automatic transmission mechanism and the stepwise variable automatic transmission mechanism which has the larger response delay than that of the one of the continuously variable automatic transmission mechanism and the stepwise variable automatic transmission mechanism is the continuously variable automatic transmission mechanism.

6. The control apparatus as claimed in claim 3, wherein the other of the continuously variable automatic transmission mechanism and the stepwise variable automatic transmission mechanism which has the larger response delay than that of the one of the continuously variable automatic transmission mechanism and the stepwise variable automatic transmission mechanism is the stepwise variable automatic transmission mechanism, and
wherein the one of the continuously variable automatic transmission mechanism and the stepwise variable automatic transmission mechanism which has the smaller response delay than that of the other of the continuously variable automatic transmission mechanism and the stepwise variable automatic transmission mechanism is the continuously variable automatic transmission mechanism.

7. A control method of controlling an automatic transmission system including a serial arrangement of a stepwise variable automatic transmission mechanism capable of selecting an optional speed from a plurality of speeds, and a continuously variable automatic transmission mechanism capable of continuously varying a transmission ratio thereof and performing a shift control of the continuously variable automatic transmission mechanism in accordance with variation in transmission ratio of the stepwise variable automatic transmission mechanism, the control method comprising the steps of:
setting a total target transmission ratio of the continuously variable automatic transmission mechanism and the stepwise variable automatic transmission mechanism;
setting a target transmission ratio of one of the continuously variable automatic transmission mechanism and the stepwise variable automatic transmission mechanism;

setting a retardation-processed target transmission ratio by subjecting the set target transmission ratio of the one of the continuously variable automatic transmission mechanism and the stepwise variable automatic transmission mechanism to a retardation processing;

setting a control target transmission ratio of the other of the continuously variable automatic transmission mechanism and the stepwise variable automatic transmission mechanism on a basis of:
(a) either the set target transmission ratio before being subjected to the retardation processing or the set retardation-processed target transmission ratio, and
(b) the set total target transmission ratio;

controlling the one of the continuously variable automatic transmission mechanism and the stepwise variable automatic transmission mechanism on a basis of either the set retardation-processed target transmission ratio or the set target transmission ratio; and controlling the other of the continuously variable automatic transmission mechanism and the stepwise variable automatic transmission mechanism on a basis of the set control target transmission ratio and the set total target transmission ratio.

8. The control method as claimed in claim 7, wherein the one of the continuously variable automatic transmission mechanism and the stepwise variable automatic transmission mechanism has a smaller response delay than that of the other of the continuously variable automatic transmission mechanism and the stepwise variable automatic transmission mechanism,
wherein the control target transmission ratio is set on a basis of the set target transmission ratio before being subjected to the retardation processing and the set total target transmission ratio, and
wherein the one of the continuously variable automatic transmission mechanism and the stepwise variable automatic transmission mechanism is controlled on a basis of the set retardation-processed target transmission ratio.

9. The control method as claimed in claim 7, wherein the one of the continuously variable automatic transmission mechanism and the stepwise variable automatic transmission mechanism has a larger response delay than that of the other of the continuously variable automatic transmission mechanism and the stepwise variable automatic transmission mechanism,
wherein the control target transmission ratio is set on a basis of the set retardation-processed target transmission ratio and the set total target transmission ratio, and
wherein the one of the continuously variable automatic transmission mechanism and the stepwise variable automatic transmission mechanism is controlled on a basis of the set target transmission ratio before being subjected to the retardation processing.

10. The control method as claimed in claim 8, further comprising the step of making a determination of transition to the set target transmission ratio of the one of the continuously variable automatic transmission mechanism and the stepwise variable automatic transmission mechanism in advance by an amount of a response delay of the other of the continuously variable automatic transmission mechanism and the stepwise variable automatic transmission mechanism which is larger than that of the one of the continuously variable automatic transmission mechanism and the stepwise variable automatic transmission mechanism.

11. The control method as claimed in claim 8, wherein the one of the continuously variable automatic transmission mechanism and the stepwise variable automatic transmission mechanism which has the smaller response delay than that of the other of the continuously variable automatic transmission mechanism and the stepwise variable automatic transmission mechanism is the stepwise variable automatic transmission mechanism, and
wherein the other of the continuously variable automatic transmission mechanism and the stepwise variable automatic transmission mechanism which has a larger response delay than that of the one of the continuously variable automatic transmission mechanism and the stepwise variable automatic transmission mechanism is the continuously variable automatic transmission mechanism.

12. The control method as claimed in claim 9, wherein the one of the continuously variable automatic transmission mechanism and the stepwise variable automatic transmission mechanism which has the larger response delay than that of the other of the continuously variable automatic transmission mechanism and the stepwise variable automatic transmission mechanism is the stepwise variable automatic transmission mechanism, and
wherein the other of the continuously variable automatic transmission mechanism and the stepwise variable automatic transmission mechanism which has a smaller response delay than that of the one of the continuously variable automatic transmission mechanism and the stepwise variable automatic transmission mechanism is the continuously variable automatic transmission mechanism.

* * * * *